US008291045B2

(12) United States Patent
Stone et al.

(10) Patent No.: US 8,291,045 B2
(45) Date of Patent: Oct. 16, 2012

(54) BRANDED CONTENT

(75) Inventors: Brion G. Stone, Redmond, WA (US);
Eric W Hebenstreit, Bellevue, WA (US); Emmanuel Miranda-Steiner, Redmond, WA (US); Lucius B. C. A. Fleuchaus, Redmond, WA (US); Oliver I. Wallace, Redmond, WA (US); Scott D. Stacey, Seattle, WA (US); Arnold Neil Blinn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1704 days.

(21) Appl. No.: 11/057,420

(22) Filed: Feb. 14, 2005

(65) Prior Publication Data

US 2006/0184375 A1 Aug. 17, 2006

(51) Int. Cl.
*G06F 15/16* (2006.01)
(52) U.S. Cl. ............ 709/219; 717/168; 717/178; 705/1; 705/14
(58) Field of Classification Search .................. 713/100, 713/170, 156; 379/93; 705/1, 14, 27, 14.19, 705/4; 709/217; 701/3; 707/10; 455/422.1; 715/765; 717/178
See application file for complete search history.

(56) References Cited

U.S. PATENT DOCUMENTS

| | | | | |
|---|---|---|---|---|
| 6,877,093 B1* | 4/2005 | Desai et al. | ................... | 713/156 |
| 6,883,000 B1* | 4/2005 | Gropper | .......................... | 707/10 |
| 7,020,797 B2* | 3/2006 | Patil | ................. | 714/4 |
| 7,249,035 B2* | 7/2007 | Stinson et al. | ..................... | 705/1 |
| 7,275,089 B1* | 9/2007 | Marshall et al. | ............. | 709/219 |
| 7,363,258 B2* | 4/2008 | Svendsen et al. | ............... | 705/27 |
| 7,447,747 B2* | 11/2008 | Toomey | ....................... | 709/217 |
| 7,457,955 B2* | 11/2008 | Seshadri et al. | .............. | 713/170 |
| 7,797,190 B1* | 9/2010 | Peden et al. | ............... | 705/14.19 |
| 2001/0029527 A1* | 10/2001 | Goshen | ......................... | 709/218 |
| 2001/0054004 A1* | 12/2001 | Powers | .......................... | 705/14 |
| 2002/0087352 A1* | 7/2002 | Armstrong et al. | ............... | 705/1 |
| 2002/0157091 A1* | 10/2002 | DeMello et al. | .............. | 717/178 |
| 2002/0165936 A1* | 11/2002 | Alston et al. | .................. | 709/217 |
| 2004/0030598 A1* | 2/2004 | Boal | .............................. | 705/14 |
| 2005/0149397 A1* | 7/2005 | Morgenstern et al. | .......... | 705/14 |
| 2005/0209744 A1* | 9/2005 | Ihbe et al. | ......................... | 701/3 |
| 2005/0289474 A1* | 12/2005 | Master et al. | ................. | 715/765 |
| 2006/0058019 A1* | 3/2006 | Chan et al. | ................. | 455/422.1 |

* cited by examiner

*Primary Examiner* — Dustin Nguyen
(74) *Attorney, Agent, or Firm* — Lee & Hayes, PLLC

(57) ABSTRACT

Configuration of an application module to utilize branded content is described. In an implementation, a method includes identifying one of a plurality of business relationships which correspond to a request sent by a client over a network. A configuration file is the formed for communication to the client and for configuration of an application module of the client to utilize branded content which corresponds to the identified business relationship.

22 Claims, 5 Drawing Sheets

BRANDED CONTENT

TECHNICAL FIELD

The present invention generally relates to branded content and more particularly relates to configuration of an application module to utilize branded content.

BACKGROUND

Application modules may be utilized to provide a variety of functionality. For example, an application module may be configured as a web browser to navigate to content over the Internet. In another example, an application module may be configured as a web application that provides the content over the Internet. For instance, the application module may be configured as a web application that retrieves and communicates web pages in response to requests received from the web browser.

In some instances, it may be desirable to configure the application module to correspond to a particular business entity. For example, a browser may be configured to include branded content from a particular internet service provider (ISP), such as a business logo of the ISP. Thus, a user of the browser may view a display of the branded content (e.g., the logo) when executing the browser. Typically, however, application modules were preconfigured (e.g., "hard coded") to only include particular branded content. Therefore, the application module could only display the particular branded content which was "hard coded" into the application module, which prevented the application module from being reconfigured to include different branded content. The inability to reconfigure the application module limited the usefulness of the module and may result in confusion on the part of users. For example, a user may receive an "old" application module which includes outdated branded content, such as a logo which is no longer utilized by the business entity, a business entity that is no longer in existence, and so on.

Therefore, there is a continuing need for improved techniques for configuring application modules to utilize branded content.

SUMMARY

Configuration of an application module to utilize branded content is described. In an implementation, a method includes identifying one of a plurality of business relationships which correspond to a request sent by a client over a network. A configuration file is formed for communication to the client and for configuration of an application module of the client to utilize branded content which corresponds to the identified business relationship.

In another implementation, a method includes determining whether a version of branded content stored locally on a client has an updated version, and if so, obtain the updated version. Each version of the branded content corresponds to a business relationship involving the client and is for configuration of an application module to utilize functionality which is selected based on the business relationship.

BRIEF DESCRIPTION OF THE DRAWINGS

The same reference numbers are utilized in instances in the discussion to reference like structures and components.

DETAILED DESCRIPTION

Overview

Configuration of an application module to utilize branded content is described. Typical application modules were configured to display branded content (e.g., logos, text, and so on) for a particular business entity. For example, a creator of the application module (e.g., a browser) may modify the application module to display a logo of an Internet service provider. The modified application module was then distributed, either by the creator or the business entity, for use by a client, such as a person operating a desktop personal computer. However, a wide variety of these modified application modules may be distributed by a wide variety of different business entities. Therefore, a client may be associated with a particular business entity (e.g., the ISP) but obtain an application module that is configured for use with another business entity, e.g., another ISP. This may result in the client utilizing an application module which does not include the branded content for the corresponding business entity, which as a consequence may cause a reduction in the usefulness of the application module for the client.

In an implementation, systems, methods, and apparatus are described which may be utilized to configure an application module to obtain branded content which corresponds to a particular client. For example, the client may obtain an application module (e.g., a browser) which is configured to obtain branded content for the particular client based on a business relationship which corresponds to the client, such as a contract entered into by the client to utilize a particular internet service provider. Thus, the client may obtain the application module from any distribution channel yet still obtain relevant branded content, which allows the branded content to "roam" with the client. In the following discussion, an exemplary environment is first described which is operable to employ the configuration techniques. Exemplary procedures are then described which may be utilized in the exemplary environment, as well as in other environments.

Exemplary Environment

Figure 1:
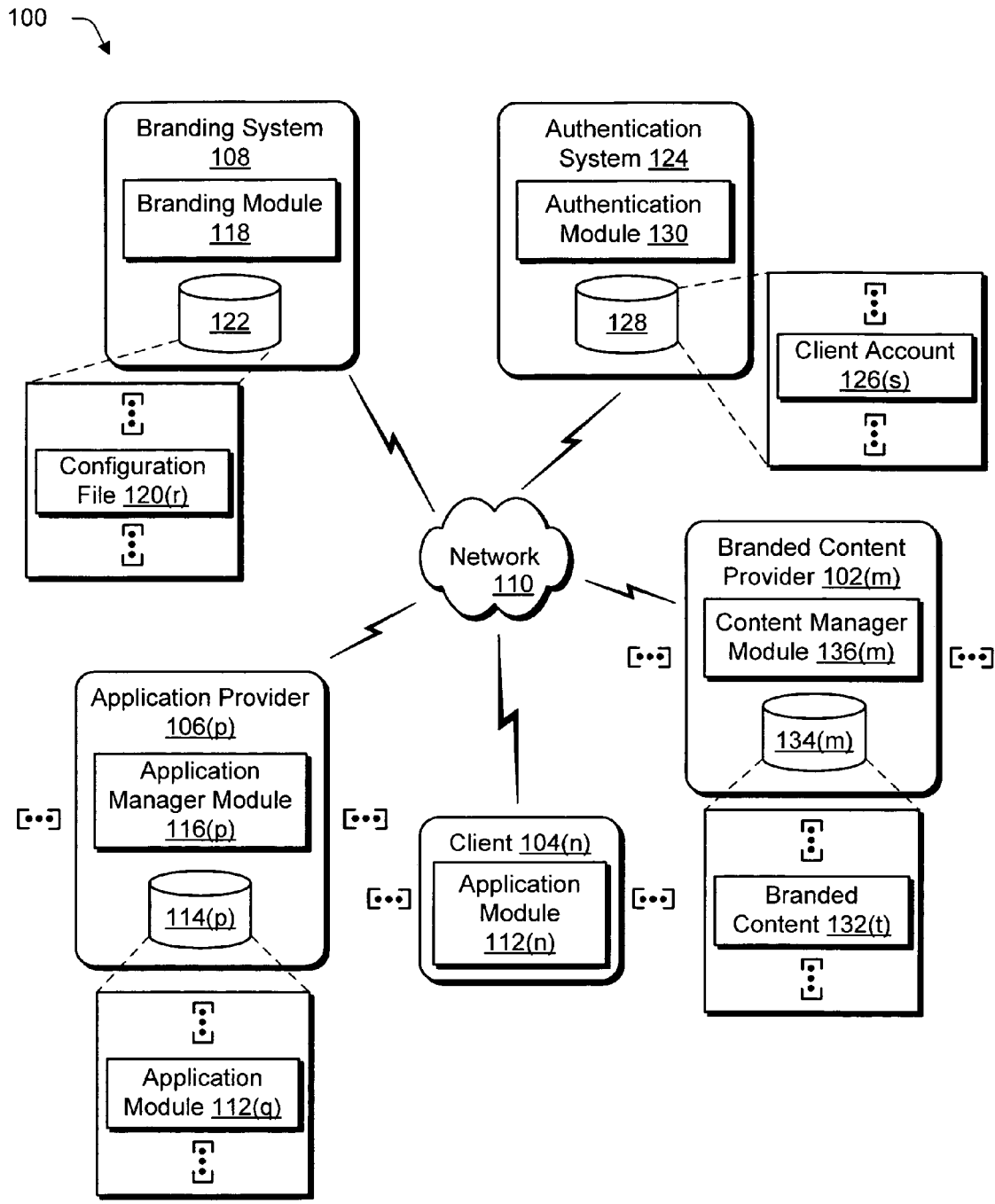
FIG. 1 is an illustration of an environment in an exemplary implementation that is operable to employ application module configuration techniques.

FIG. 1 is an illustration of an environment 100 in an exemplary implementation that is operable to employ techniques for configuration of application modules. The illustrated environment 100 includes a plurality of branded content providers 102(m) (where "m" can be any integer from one to "M"), a plurality of clients 104(n) (where "n" can be any integer from one to "N"), a plurality of application providers 106(p) (where "p" can be any integer from one to "P"), and a branding system 108. The clients 104(n) may be configured in a variety of ways. For example, one or more of the clients 104(n) may be configured as a computing device, such as a desktop computer, a mobile station, an entertainment appliance, a set-top box communicatively coupled to a display device, a wireless phone, a game console, and so forth. Thus, the clients $104(n)$ may range from full resource devices with substantial memory and processor resources (e.g., personal computers, game consoles) to low-resource devices with limited memory and/or processing resources (e.g., traditional set-top boxes, hand-held game consoles). The clients $104(n)$ may also relate to a person and/or entity that operate the clients. In other words, one or more of the clients $104(n)$ may describe logical clients that include users, software, and/or devices.

In the environment 100 of FIG. 1, the branded content providers $102(m)$, the clients $104(n)$, the application providers $106(p)$, and the branding system 108 are communicatively coupled, one to another, over a network 110. Although the network 110 is illustrated as the Internet, the network may assume a wide variety of configurations. For example, the network 110 may include a wide area network (WAN), a local area network (LAN), a wireless network, a public telephone network, an intranet, and so on. Further, although a single network is shown, the network 110 may be configured to include multiple networks. For instance, the branding system 108 and the branded content provider $102(m)$ may be communicatively coupled, one to another, over an intranet while the client $104(n)$ is communicatively coupled to the branding system 108 and the branded content provider $102(m)$ over the Internet. A wide variety of other instances are also contemplated.

The application provider $106(p)$ is illustrated as including a plurality of application modules $112(q)$, where "q" can be any integer from one to "Q", which is accessible via a database $114(p)$. The application modules $112(q)$ may be configured in a variety of ways. For example, one or more of the application modules $112(q)$ may be configured as an operating system, a word processor, a spreadsheet application, a note-taking application, a presentation application, a drawing application, a game, a browser, an application that is executable to provide content (e.g., web pages) over a network, and so on.

To manage the application modules $112(q)$, the application provider $106(p)$ may include an application manager module $116(p)$. For example, the application manager module $116(p)$ may be executable to process requests from the client $104(n)$ for a particular application module $112(q)$, perform digital rights management (e.g., receive and process billing information from the client $104(n)$), communicate the requested application module $112(n)$ over the network 110 for storage on the client $104(n)$, and so on.

The branding system 108 includes a branding module 118 which is executable to manage a plurality of configuration files $120(r)$, where "r" can be any integer from one to "R". The configuration files $120(r)$ are formed for communication to the client $104(n)$ such that the client $104(n)$ may obtain relevant branded content for utilization by the application modules $112(n)$. The branding module 118, for instance, may determine whether the client $104(n)$ is associated with a particular business entity. This determination may be performed in a variety of ways. For example, the branding system 108 may store a listing of client/business entity associations and retrieve a configuration file $120(r)$ from a database 122 based on this listing.

In another example, the branding system 108 may communicate with an authentication system 124 to determine whether the client $104(n)$ is associated with a particular business entity. The authentication system 124, for instance, may include a plurality of client accounts $126(s)$, where "s" can be any integer from one to "S", which is stored in a database 128. The authentication system 124 also includes an authentication module 130 which is executable to verify the identity of the client $104(n)$. For example, each client account $126(s)$ may have an associated client identifier and password for verifying the authenticity of the client $104(n)$. The client account $126(s)$ may also describe whether the client $104(n)$ is associated with one or more business entities. For instance, the client $104(n)$ may be "signed-up" with a particular ISP, wireless service provider, user group, credit card company, broadcast content provider (e.g., cable television provider), and so on. Thus, the branding system 108 may also determine associations by the client $104(n)$ with business entities through communication with the authentication system 124. The associations may also be determined in a wide variety of other ways without departing form the spirit and scope thereof. The branding module 118 may then form a configuration file $120(r)$ for communication to the client $104(n)$ which describes where to obtain the relevant branded content, such as from the branded content provider $102(m)$.

The branded content provider $102(m)$ includes a plurality of branded content $132(t)$, where "t" can be any integer from one to "T", which is illustrated as stored in a database 134. The branded content $132(t)$ may be configured in a variety of ways. For example, one or more of the branded content $132(t)$ may be configured for output in a user interface, such as a business logo, a business name, an audio file containing a corporate "jingle", and so on. The branded content $132(t)$ may also be configured to provide additional functionality to the application module $112(n)$, such as a link to a home page of the business entity, a tech support link to the business entity, and so on. A wide variety of other configurations for the branded content $132(t)$ are also contemplated.

The branded content provider $102(m)$ also includes a content manager module $136(m)$ which is executable to manage the branded content $132(t)$, such as to maintain different versions of the branded content, to receive and process requests from the client $104(n)$ for the branded content $132(t)$, to communicate the branded content $132(t)$ over the network 110 in response to the request, and so on. Further discussion of branded content $132(t)$ management by the branded content provider $102(m)$ may be found in relation to FIG. 5.

Although the branded content provider $102(m)$, client $104(n)$, application provider $106(p)$, branding system 108, and authentication system 124 are each illustrated separately in the environment 100 of FIG. 1, one or more of these components may be combined and/or further separated. For example, the branding system 108 may incorporate the functionality of the branded content provider $102(m)$, the application provider $106(p)$ and the branding system 108 may be combined separately from the branded content provider $102(m)$, and so on.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the configuration techniques described below are platform-independent, meaning that the techniques may be implemented on a variety of commercial computing platforms having a variety of processors.

Figure 2:
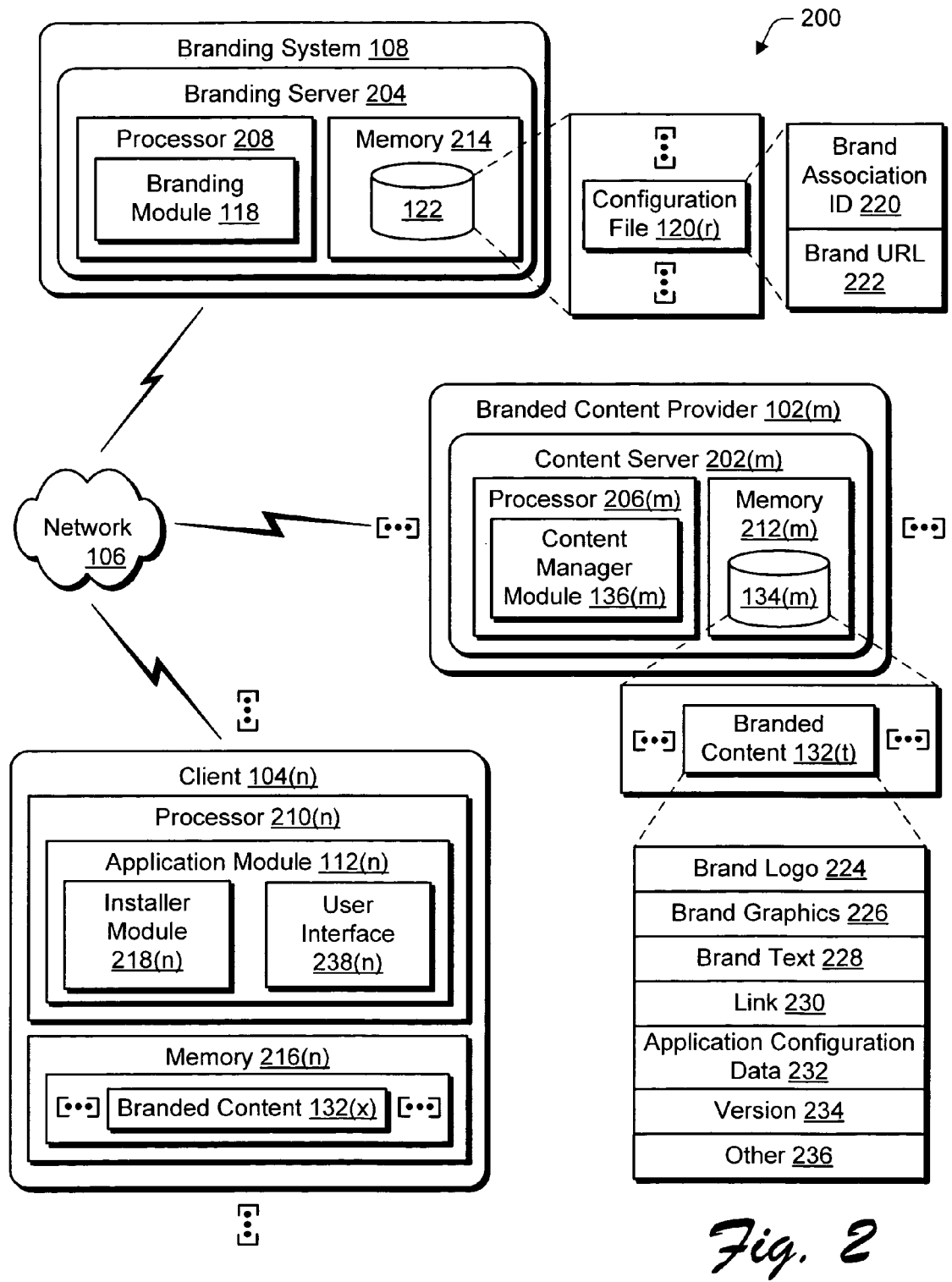
FIG. 2 is an illustration of a system in an exemplary implementation showing a branding system, a branded content provider, and a client of FIG. 1 in greater detail.

FIG. 2 is an illustration of a system 200 in an exemplary implementation showing the client 104(n), the branding system 108, and the branded content provider 102(m) of FIG. 1 in greater detail. The branded content provider 102(m), the branding system 108, and the client 104(n) are each illustrated as being implemented by one or more respective computing devices. Branded content provider 102(m), for instance, is illustrated as including a content server 202(m), branding system 108 is illustrated as including a branding server 204, and the client 104(n) is illustrated as a client device. The content server 202(m), branding server 204, and client 104(n) each include a respective processor 206(m), 208, 210(n) and a respective memory 212(m), 214, 216(n).

Processors are not limited by the materials from which they are formed or the processing mechanisms employed therein. For example, processors may be comprised of semiconductor (s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 212(m), 214, 216(n) is shown, respectively, for the content server 202(m), branding server 204, and client 104(n), a wide variety of types and combinations of memory may be employed, such as random access memory (RAM), hard disk memory, removable medium memory, and so forth.

The client 104(n) is illustrated as executing the application module 112(n) on the processor 210(n), which is also storable in memory 216(n). The application module 112 includes an installer module 218(n) which is executable to form a request for communication over the network 110 to obtain branded content. The installer module 218(n) is executable in a wide variety of instances. For example, the installer module 218(n) may be executed upon installation of the application module 112(n) on the client 104(n) to obtain branded content. Additionally, the installer module 218(n) may be executed periodically to update branded content which is available locally at the client 104(n), further discussion of which may be found in relation to FIG. 4.

The branding module 118 is illustrated as being executed on the processor 208 of the branding server 204, and is also storable in memory. As previously described, the branding module 118 is executable to provide one or more of a plurality of configuration files 120(r) to the client 104(n) for configuration of the application module 112(n). Configuration file 120(r), for instance, may include a brand association ID 220 and a brand URL 222. The brand association ID 220 is configured to identify a particular business association of the client 104(n), such as a particular contractual arrangement between the client 104(n) and a particular service provider. The brand URL 222 is a network address of where to locate the branded content which corresponds to the brand association ID 220, such as a network address of the branded content provider 102(m). Thus, the branding system 108 may act as a centralized location for branding information through specification of where to obtain the branded content over the network 110.

The content server 202(m) is illustrated as executing the content manager module 136(m) on the processor 206(m), which is also storable in memory 212(m). The content manager module 136(m) is executable to manage the plurality of branded content 118(n) which is depicted as stored in the memory 212(m). The plurality of branded content may be configured in a variety of ways. For example, the branded content 132(t) may include a variety of branded content which is configured for output in a user interface of an application module 112(n), such as a brand logo 224 (e.g., a logo of a business entity), brand graphics 226 (e.g., a brand banner, "splash screen", and so on), brand text (e.g., a trademarked phrase of the business entity), and so on. The branded content 132(t) may also add functionality to the application module 112(n), such as a link 230 (e.g., to the service provider's home page, transaction page, customer support page, "tech" support page, and so forth), application configuration data 232 (e.g., features that are or are not installed based on a business relationship), specify a version 234 of the branded content 132(t) (further discussion of which may be found in relation to FIG. 4), and other 236 branded content.

The installer module 218(n) is further executable by the client 104(n) to configure the application module 112(n) based on the branded content 132(x), where "x" can be any integer from one to "X". For example, the installer module 218(n) may configure the application to "look" to particular items of branded content 132(x), such as for output in a user interface 238(n) of the application module 112(n), and so on. It should be noted that the branded content 132(x) is illustrated as separate from the application module 112(n) to depict that utilization of the branded content 132(x) by the application module 112(n) is "flexible", in that the branded content 132(x) may be added to, deleted, or changed without significantly altering the application module 112(n). Thus, the application module 112(n) may act as a generic platform which may obtain utilize a variety of different branded content. Further discussion of branded content flexibility may be found in relation to FIG. 4.

Exemplary Procedures

The following discussion describes configuration techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
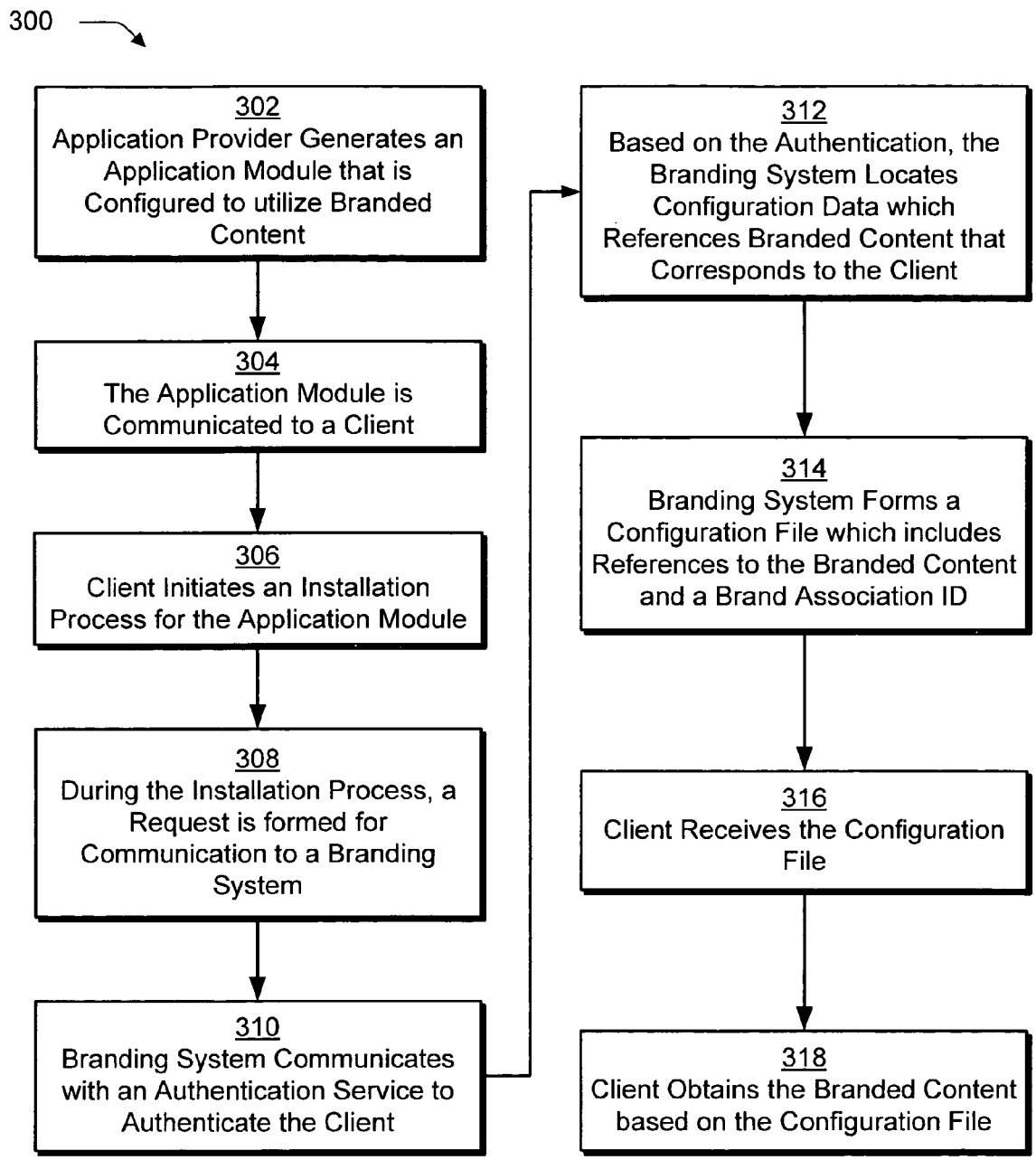
FIG. 3 is a flow diagram depicting a procedure in an exemplary implementation in which an application module is generated by an application provider and installed on a client to obtain branded content.

FIG. 3 is a flow diagram depicting a procedure 300 in an exemplary implementation in which an application module is generated by an application provider and installed on a client to obtain branded content. First, an application provider 106 (p) generates an application module 112(n) that is configured to utilized branded content (block 302). For example, the application module 112(n) may be configured to incorporate a business logo and a business name of a business entity in a user interface. The application module 112(n) may also be configured to include reconfigurable links, such as a link that may be configured to point to a home page of the business entity. In this exemplary implementation, however, the application module does not include branded content for each part of the application module that is configurable to include branded text. For example, the application module may be configured to utilize "generic" content which is not particular to any business entity.

The application module 112(n) is then communicated to the client 104(n) (block 304), which may be performed in a variety of ways. For instance, the application module 112(n) may be written to a computer-readable medium (e.g., a CD-ROM) for physical distribution to the client 104(n). In another instance, the application module 112(n) is communicated from the application provider 106(p) to the client 104(n) over the network 110.

The client 104(n) then initiates an installation process for the application module 112(n) (block 306). For example, execution of the installer module 218(n) on the client 104(n) may begin. During the installation process, a request is formed for communication to the branding system 108 (block 308) to obtain branded content. Upon receipt of the request, the branding system 108 communicates with the authentication system 124 to authenticate the client 104(n) (block 308). For example, the branding system 108 may communicate a user ID and a password from the client 104(n) to authenticate the identity of the client. When the client's identity is confirmed, the branding system 108 may further communicate with the authentication system 124 to find one or more brands which are associated with the client.

Based on the authentication, the branding system 108 locates configuration data which references branded content that corresponds to the client 104(n) (block 312). For example, the branding system may locate network addresses of particular branded content 132(t) and a brand association ID of the branded content. The branding system 108 may then form a configuration file which includes references to the branded content and the brand association ID (block 314). The client 104(n) may then receive the configuration file (block 316) and obtain the branded content based on the configuration file (block 318), an example of which is described in relation to the following figure.

Figure 4:
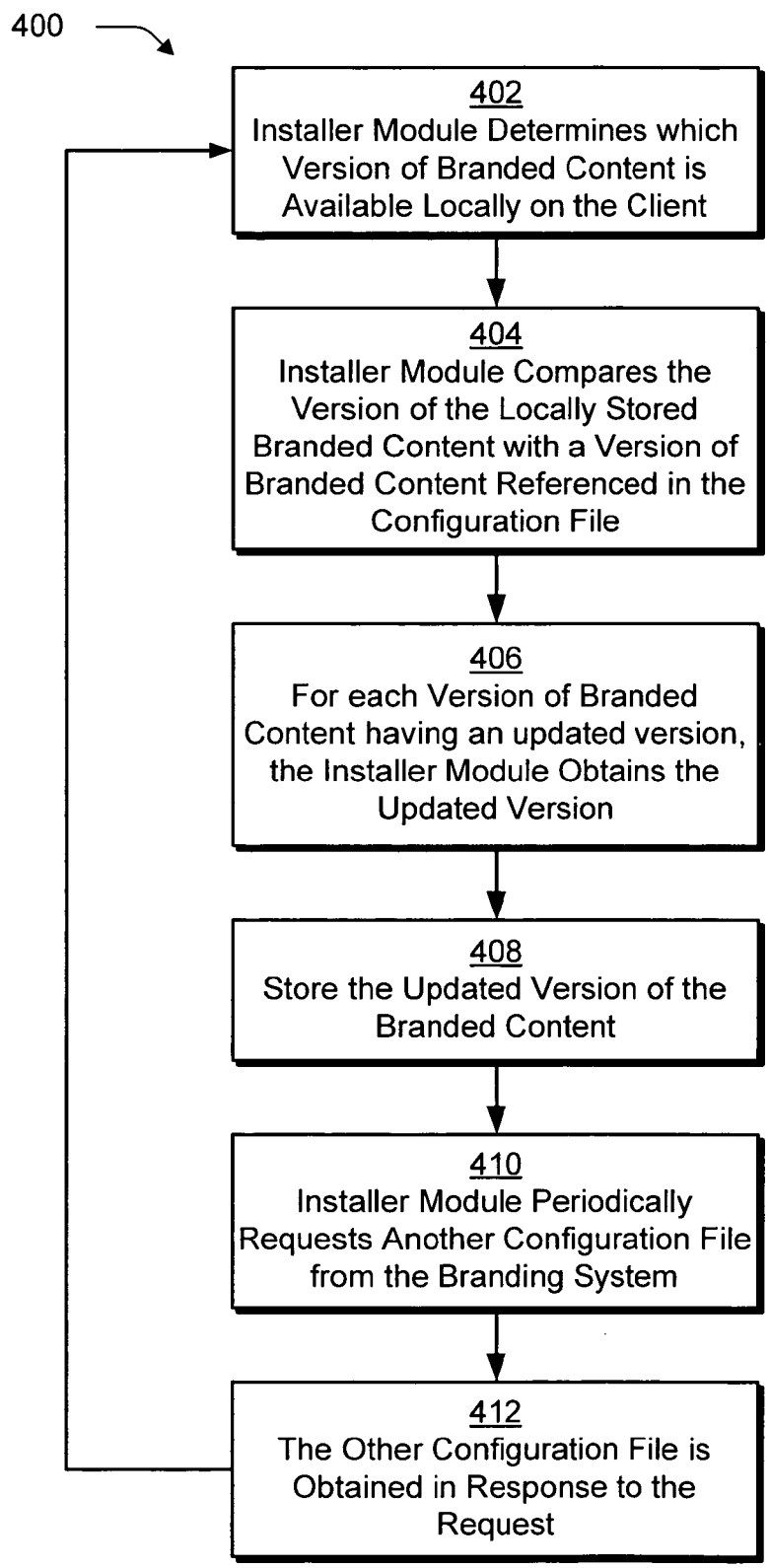
FIG. 4 is a flow diagram depicting a procedure in an exemplary implementation in which branded content is obtained by an application module for use in the execution of the application module.

FIG. 4 is a flow diagram depicting a procedure 400 in an exemplary implementation in which branded content is obtained by an application module for use in the execution of the application module. The installer module 218(n) determines which version of branding content is available locally on the client 104(n). For example, the installer module 218(n) may be executed to install the application module 112(n) on the client 104(n) from a computer-readable medium, such as a CD-ROM. The CD-ROM may include a version of branded content and have a version identifier which identifies which version is available, such as by date, version number (e.g. "1.0"), and so on.

The installer module then compares the version of the locally stored branding content with a version of branding content referenced in the configuration file (block 404). For example, the configuration file received by the client in FIG. 3 (i.e., block 316), may include a version number for the branded content which is available via the network 110. The installer module 218(n) may compare the version numbers to determine if the branded content which is available over the network 110 is an updated (i.e., "more recent") version of the content that is available from the CD-ROM. Therefore, for each version of branding content that has an updated version, the installer module 218(n) is executed to obtain the updated version (block 406). The obtained updated version of the branding content is stored (block 408) locally on the client 104(n). Thus, the application module 112(n) may retrieve branded content during the installation process thereof.

Execution of the installer module 218(n) is not limited to the installation process of the application module 112(n). For example, the installer module 218(n) may be executed to periodically request another configuration file from the branding system 108 (block 410) and obtain the configuration file (block 412). The installer module 218(n) may again determine which version of branded content is available locally (block 402), compare the version with the version which is available as described in the configuration file (block 404), and obtain an updated version for each branded content having an updated version (block 406). In this way, the branded content that is available locally on the client 104(n) is kept "up-to-date" and may continually reflect changing business associations of the client 104(n), further discussion of which may be found in relation to FIG. 5.

It should be noted that in the procedure 400 described in the exemplary implementation of FIG. 4, the configuration file which was communicated "referenced" branded content and did not actually include the branded content. Therefore, the installer module 218(n) could obtain the updated branded content without obtaining branded content which was already located on the client. Thus, the configuration file may be configured to conserve hardware and software resources of the client 104(n), branding system 108, and branded content provider 102(m), as well as conserve network 110 resources.

Figure 5:
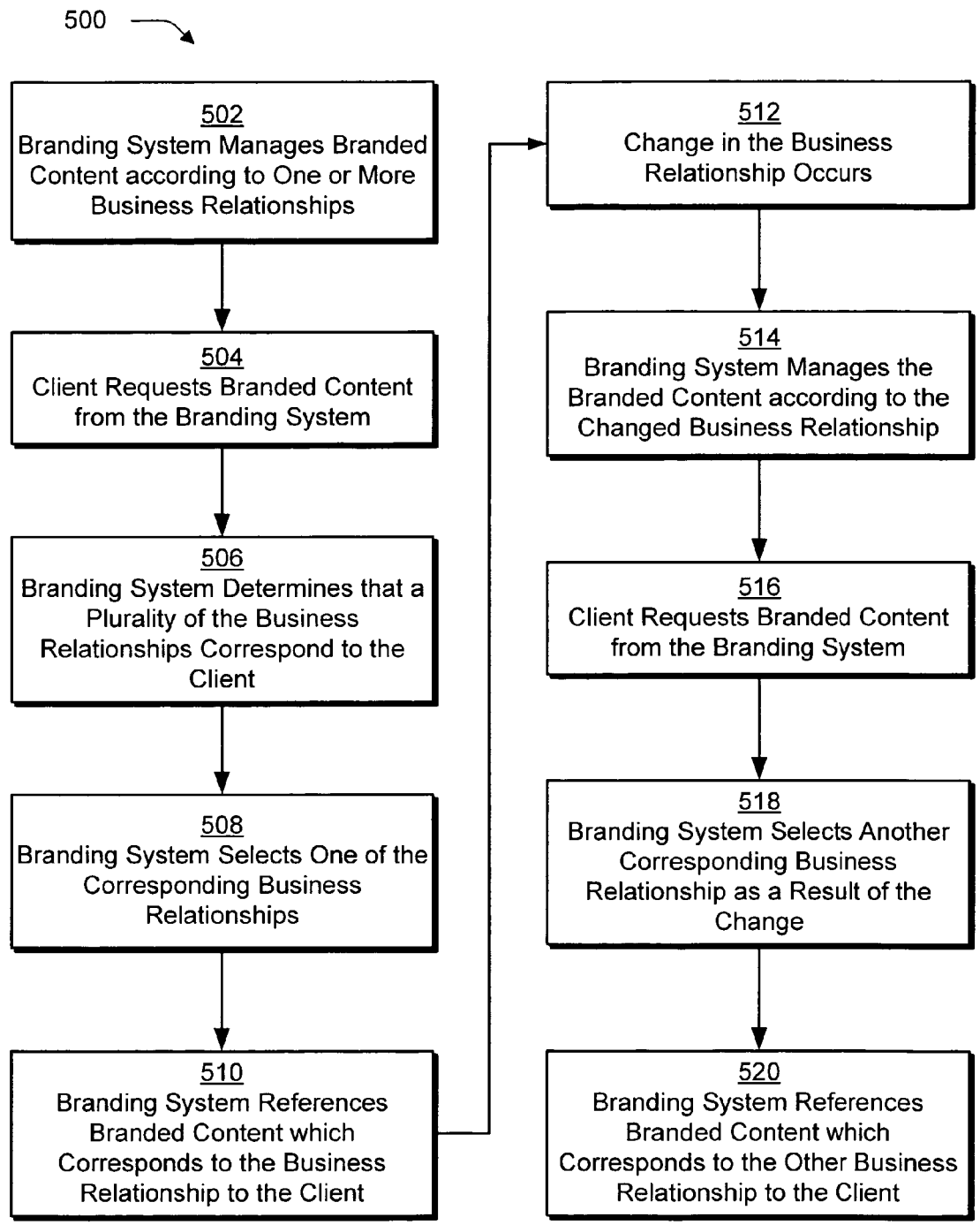
FIG. 5 is a flow diagram depicting a procedure in an exemplary implementation in which a branding system manages branded content to address changing business relationships.

FIG. 5 is a flow diagram depicting a procedure 500 in an exemplary implementation in which a branding system manages branded content to address changing business relationships. The branding system manages branded content according to one or more business relationships (block 502). The business relationships may relate to a wide variety of combinations of business entities. For example, the application provider 106(p) and the branded content provider 102(m) may have a business relationship in which the application provider agrees to allow branded content of the branded content provider to be utilized by the application module 112(q). In another example, the client 104(n) may have a business relationship with the branded content provider 102(m) for goods or services, such as for internet access, wireless telephone access, broadcast content subscription (e.g., television), music subscription (e.g., radio, downloadable songs), and so on. In addition, the client 104(n) may have a business relationship with the application provider 106(p). For example, the client 104(n) may purchase the application module 112(q), may agree to view branded content for "free use" of the application module 112(q), and so on. Thus, the client 104(n) may have a plurality of business relationships. Each of these business relationships may be addressed by the branding system by selecting which branded content is referenced in the configuration file.

A client requests branded content from the branding system (block 504). In response to the request, the branding system determines that a plurality of business relationships correspond to the client (block 506). For example, the client may enter into a contractual agreement with a wireless network provider (e.g., for voice and data access), be a member of a car club, and so on. The branding system may then select one of the corresponding business relationships (block 508). Continuing with the previous example, the branding system may determine that the contractual agreement with the wireless network provider is to be given priority. This priority may be determined in a variety of ways, such as based on a preconfigured list in which each business relationship is arranged in a hierarchy, computed based on the application module, for which, the branded content is to be utilized to compute a "score" for each business relationship, and so on. The branding system may then reference branded content which corresponds to the business relationship which is relevant to the client (block 510).

At a later point in time, a change in the business relationship occurs (block 512). For example, the agreement the application provider made with the branded content provider 102(m) may have lapsed. In another example, the client may have entered into an agreement with a different one of the plurality of content providers 102(m). In a further example, the business relationship between the client and the application provider 106(p) may have changed. Accordingly, the branding system manages the branded content accordingly to the changed business relationship (block 514).

The client, for instance, may again request branded content from the branding system (block 516). It should be noted that in this example, the request may be made for the branded content itself and/or a configuration file which references the branded content. In response to the request, the branding system selects another corresponding business relationship as a result of the change (block 518) and references branded content which corresponds to the other business relationship (block 520). Continuing with the previous example, the client had a business relationship with a wireless provider and a car club. However, the agreement between the wireless provider and the application provider 106(*p*) may have lapsed. Therefore, the branding system 108 will no longer reference branded content which corresponds to the wireless service provider, but rather will reference branded content which corresponds to the car club. The reference to the branded content may be utilized as previously described to update branded content utilized by the application module. Thus, the branded content utilized by the application module may be kept "up-to-date" through use of the branding system.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    identifying, by a branding system, a particular business relationship of a plurality of business relationships associated with a client, wherein the particular business relationship is between a particular business entity and the client and corresponds to a request sent by the client over a network;
    forming, by the branding system, a configuration file that includes branded content for:
        communication to the client;
        storage of a plurality of configuration parameters of a client application module; and
        configuration of the client application module to utilize the branded content which corresponds to the particular business relationship and to utilize additional branded content which corresponds to an additional business relationship between an additional business entity and the client;
    sending the configuration file from the branding system to the client;
    determining, by the branding system, that the particular business relationship between the particular business entity and the client has ended;
    in response to the determining, deleting, by the branding system, branded content associated with the particular business entity and generating an additional configuration file; and
    sending the additional configuration file from the branding system to the client.

2. A method as described in claim 1, wherein the particular business relationship involves the client and an application provider which generated the client application module.

3. A method as described in claim 1, wherein the particular business relationship involves the client and a branded content provider which is configured to provide the branded content.

4. A method as described in claim 1, wherein the configuration file includes a reference indicating where to locate the branded content over a network.

5. A method as described in claim 1, wherein one or more business relationships are arranged such that at least one business relationship is given priority over another business relationship.

6. A method as described in claim 1, wherein the client application module is configured as software which is selected from the group consisting of:
    an operating system;
    a browser;
    a game;
    a word processor;
    a note-taking application;
    an email application;
    a presentation application;
    a drawing application;
    an application that is executable to provide content over a network;
    a scheduling application; and
    a spreadsheet application.

7. A method as described in claim 1, wherein the branded content is selected from the group consisting of:
    a link to a web page of a business entity, with which, the client has the particular business relationship;
    a logo of the business entity;
    brand text; and
    application configuration data.

8. A method as described in claim 1, further comprising determining whether a version of the branded content stored locally on the client has an updated version as referenced by the configuration file, and if so, obtaining the updated version.

9. A method as described in claim 1, further comprising:
    receiving the client application module which is configured to output generic content when the branded content is not available; and
    initiating an installation process to install the client application module on the client, wherein the installation process includes the identifying and the configuring.

10. A method comprising:
    receiving a configuration file referencing branded content;
    determining whether a version of the branded content stored locally on a client has an updated version by comparing the version of the branded content stored locally on the client with a version of the branded content that is referenced in the configuration file, and if so, modifying the local branded content with the updated version, the determining being performed during installation of an application module on the client, wherein both the version of the branded content stored locally on the client and the version of the branded content that is referenced in the configuration file:
        corresponds to a business relationship involving the client and a business entity; and
        is for configuration of the application module to include functionality which is selected based on the business relationship;
    sending a request for the branded content to a branding system; and
    receiving additional branded content for a new business relationship involving the client in response to the request, the new business relationship involving the client and an additional business entity.

11. A method as described in claim 10, wherein the business relationship, the new business relationship, or both involve:
the client and an application provider which generated the application module; or
the client and a branded content provider which is configured to provide the branded content, the additional branded content, or both.

12. A method as described in claim 10, wherein one or more business relationships are arranged such that at least one business relationship is given priority over another business relationship.

13. A method as described in claim 10, wherein the determining is further performed after installation of the application module on the client has been completed.

14. A method comprising during an installation process of an application module on a client:
forming a request for communication to a branding system;
receiving a configuration file in response to the request which includes at least one uniform resource locator (URL) for locating branded content which corresponds to a new business relationship which involves the client and a business entity, the branded content containing configuration parameters;
obtaining the branded content referenced by the URL;
by comparing pre-existing branded content stored in memory of the client with the obtained branded content, determining that the obtained branded content includes an additional business entity, or
updated branded information associated with one or more pre-existing business entities,
the pre-existing branded content being associated with one or more pre-existing business relationships involving the client and the one or more pre-existing business entities;
adding the obtained branded content to the pre-existing branded content; and
modifying the application module on the client based on the configuration parameters of the obtained branded content.

15. A method as described in claim 14, wherein the new business relationship involves:
the client and an application provider which generated the application module; or
the client and a branded content provider which is configured to provide the branded content.

16. A method as described in claim 14, further comprising selecting the new business relationship which involves the client instead of another business relationship which involves the client based on a priority given to each business relationship.

17. A method as described in claim 14, wherein the configuration file includes a brand association identifier (ID) for communication to a branded content provider which is accessible via the URL.

18. A method comprising:
receiving, via a network, a communication from a client computing device wherein the communication relates to an application, installed on the client computing device, configured to access Internet information and wherein the communication comprises brand information;
identifying contractual information associated with a service provider and associated with the application installed on the client computing device based on the brand information of the communication and based on a priority of the service provider with respect to preconfigured priorities of a plurality of additional business relationships associated with the client computing device;
based on the contractual information, locating stored brand information;
determining whether the brand information of the received communication corresponds to the located, stored brand information; and
if the brand information of the received communication does not correspond to the located, stored brand information, transmitting brand resources to the client computing device to allow for branding a user interface of the application according to the located, stored brand information, wherein branding a user interface comprises:
configuring the application installed on the client computing device to include functionality which is selected based on the contractual information.

19. The method of claim 18 further comprising, periodically receiving, via the network, communications wherein each of the communications relates to the application and wherein each of the communications comprises the brand information.

20. The method of claim 1, wherein the branded content determines appearance and functionality of the client application module based on the particular business relationship.

21. The method of claim 10, wherein the branded content, the additional branded content, or both determine appearance and functionality of the application module based on the business relationship involving the client, the new business relationship involving the client, or both.

22. The method of claim 14, wherein the branded content determines appearance and functionality of the client application module based on the new business relationship involving the client.

* * * * *